United States Patent [19]

Kuznetsov

[11] Patent Number: 4,477,760
[45] Date of Patent: Oct. 16, 1984

[54] CONTINUOUS POLE AMPLITUDE MODULATED ELECTRIC MACHINES

[75] Inventor: Stephen B. Kuznetsov, Pittsburgh, Pa.
[73] Assignee: Westinghouse Electric Corp., Pittsburgh, Pa.
[21] Appl. No.: 478,431
[22] Filed: Mar. 24, 1983
[51] Int. Cl.³ .............................................. H02P 7/48
[52] U.S. Cl. .................... 318/773; 318/771; 318/776
[58] Field of Search ............. 318/773, 774, 729, 771, 318/775, 776

[56] References Cited

U.S. PATENT DOCUMENTS

| | | | |
|---|---|---|---|
| 1,712,237 | 5/1929 | Weichsel | 318/729 |
| 3,876,923 | 4/1975 | Humphrey et al. | 363/40 |
| 3,925,688 | 12/1975 | Kalfus | 307/252 N |
| 4,070,605 | 1/1978 | Hoeppner | 318/808 |
| 4,313,075 | 1/1982 | Stewart et al. | 318/807 |
| 4,413,218 | 11/1983 | Taylor et al. | 318/771 |

*Primary Examiner*—David Smith, Jr.
*Attorney, Agent, or Firm*—R. P. Lenart

[57] ABSTRACT

A pole amplitude modulated electric machine is operated at continuously variable speeds between fixed limits by a control circuit which rapidly switches the stator winding between the upper and lower pole number configurations. The switching is controlled such that the stator winding remains in each configuration for a time which exceeds the cycle time of an external power source but is less than the combined magnetization-rotor loop time constant of the machine. Phase control of the switching can be used to control speed in the vicinity of the fixed limits. In all cases, the input power frequency remains constant.

9 Claims, 6 Drawing Figures

CONTINUOUS POLE AMPLITUDE MODULATED ELECTRIC MACHINES

BACKGROUND OF THE INVENTION

This invention relates to rotary electric machines which are wound in the pole amplitude modulation scheme of stator coil connections and more particularly to the use of controlled switching devices with such machines to permit continuous adjustable speed operation between two fixed operating speeds characteristic of the pole amplitude modulation operating points.

Alternating current machines which provide alternative first and second pole numbers by a method of phase winding switching known as pole amplitude modulation are well known and have been described in various patents and publications. For example, several embodiments of pole changing machines have been described in two papers by G. H. Rawcliffe et al., a first entitled "Induction-Motor Speed-Changing by Pole-Amplitude Modulation" in the Proceedings of the Institution of Electrical Engineers, Volume 105, Part A, No. 22, August 1958, and a second entitled "Speed-Changing Induction Motors, Further Developments in Pole-Amplitude Modulation" in the Proceedings of the Institution of Electrical Engineers, Volume 107, Part A, No. 36, December 1960. Pole amplitude modulated machines generally include a first and second set of terminals for connection to an external AC power source and a stator winding alternatively connectable to the first and second sets of terminals and wound to form a first number of poles between the first set of terminals and a second number of poles between the second set of terminals. The operating speed of the machine can be selected by connecting the external power source to the appropriate set of terminals. The efficient range of operation of these machines is limited to a few percent slip from the synchronous speed for the pole number for which they are connected.

The present invention combines a conventional pole amplitude modulated machine and power electronic control circuitry at the stator terminals to give a constant efficiency continuously adjustable speed operation between the two fundamental speed changing points characteristic of the conventional pole amplitude modulated winding lay-out, without variable frequency control. For an induction machine, the invention retains the conventional cage rotor and a uniform slot pitch and turns per coil around the stator periphery.

SUMMARY OF THE INVENTION

A rotary electric machine constructed in accordance with this invention comprises: first and second sets of terminals for connection to an external alternating current power source; a stator winding alternatively connectable to the first and second sets of terminals and wound to form a first number of poles between the first set of terminals and a second number of poles between the second set of terminals; a plurality of switches for switching the stator winding alternatively between the first and second sets of terminals; and means for controlling the switches wherein the time during which the stator winding is successively connected between the first and second sets of terminals is greater than the period of the external alternating current power source and less than the combined magnetization-rotor loop time constant of the motor. By switching the machine between pole numbers in this manner, it can be made to operate at a speed between the speeds defined by the first and second pole numbers.

This invention also encompasses a method of operating an electric machine having a stator winding wound to form a first pole number between a first set of terminals and a second pole number between a second set of terminals, to achieve a speed which is between the speeds defined by the first and second pole numbers, which includes the step of: switching an external alternating current power source alternatively between the first and second sets of terminals wherein the time during which said alternating power source is successively connected to either of the first and second sets of terminals is greater than the period of the alternating current power source output and less than the combined magnetization-rotor loop time constant of the machine.

DESCRIPTION OF THE PREFERRED EMBODIMENTS

Figure 1:
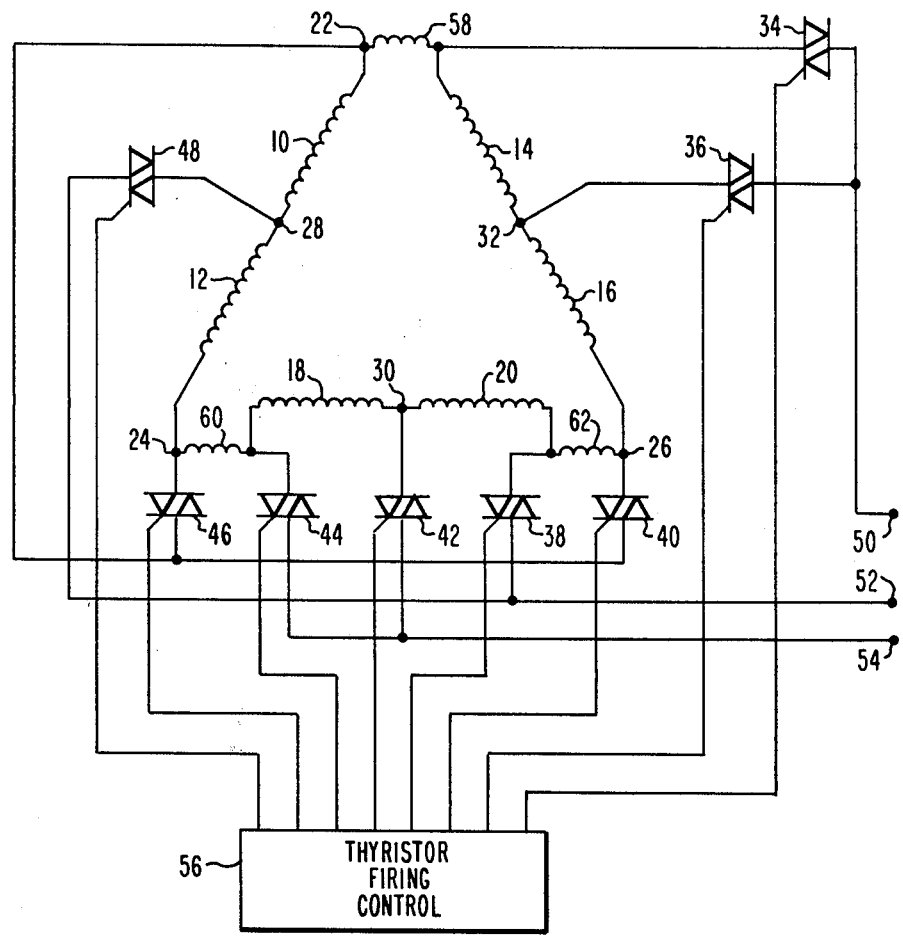
FIG. 1 is a schematic diagram of an electric machine system constructed in accordance with one embodiment of the present invention.

Referring to the drawings, FIG. 1 is a schematic diagram of an electric machine system constructed in accordance with one embodiment of this invention. The machine stator winding includes a plurality of coils 10, 12, 14, 16, 18 and 20 which are wound in accordance with known pole amplitude modulation practice to form a first number of poles when energized through terminals 22, 24 and 26, and to form a second number of poles when energized through terminals 28, 30 and 32. A plurality of switching devices such as thyristors 34, 36, 38, 40, 42, 44, 46 and 48 connect the stator coil terminals to an external alternating current power source through terminals 50, 52 and 54. Thyristor firing control 56 is coupled to each thyristor gate and controls the operation of the thyristors to alternately connect the two sets of stator coil terminals to the external power source. Although all of the motor windings can be rated at the same line or input voltage and consequent flux level, in this example only one-half of the total r.m.s. input current is actually switched by each thyristor device. By allowing the use of reduced current rating devices, a significant savings can be realized in the device manufacturing cost, weight and heat sink size. Unlike conventional phase controllers which generally phase back the applied voltage on every cycle to the motor, the continuous pole amplitude modulation controller is essentially a duty cycle controller for which the applied motor voltage is a full sinusoid over the entire on-time for each pole number with the exception of a short blanking and ramping period which allows the new pole number connection to be excited in a soft-start fashion. This eliminates the peak motor and thyristor surge current and serves to minimize electromechanical noise. In the embodiment of FIG. 1, a plurality of non-linear inductances 58, 60 and 62 have been inserted at one set of stator coil terminals. These inductances serve to limit surge currents and reduce the possibility of simultaneous conduction among thyristors 38, 40, 44 and 46, which would otherwise constitute a direct short across the supply lines in the event of a misfiring. The three inductances may be provided with a secondary type of low current transformer winding which can provide a feedback control signal to the thyristor firing circuit 56. In the most basic form of the invention, these inductances may be removed and replaced with a short.

For maximum speed operation of the machine of FIG. 1, thyristors 36, 40, 42, 46 and 48 would be on continually while the remaining thyristors are off. For low speed operation, thyristors 34, 38 and 44 would be on continually with the remaining thyristors off. For operation immediately below the upper operating speed, thyristors 36, 42 and 48 may be gated in a phase control mode to reduce the effective applied motor voltage for either minor speed regulation or power factor enhancement, while devices 40 and 46 remain fully on. For operation immediately below the lower operating speed, thyristors 34, 38 and 44 may be gated in a phase control mode for a reduction in average applied voltage. In both cases, it is understood that there is no switching between pole numbers on a continuous basis and that phase control occurs for every input cycle. This mode of phase back control is viable from synchronous speed to about 90% of synchronous speed at either fundamental pole number.

Figure 2:
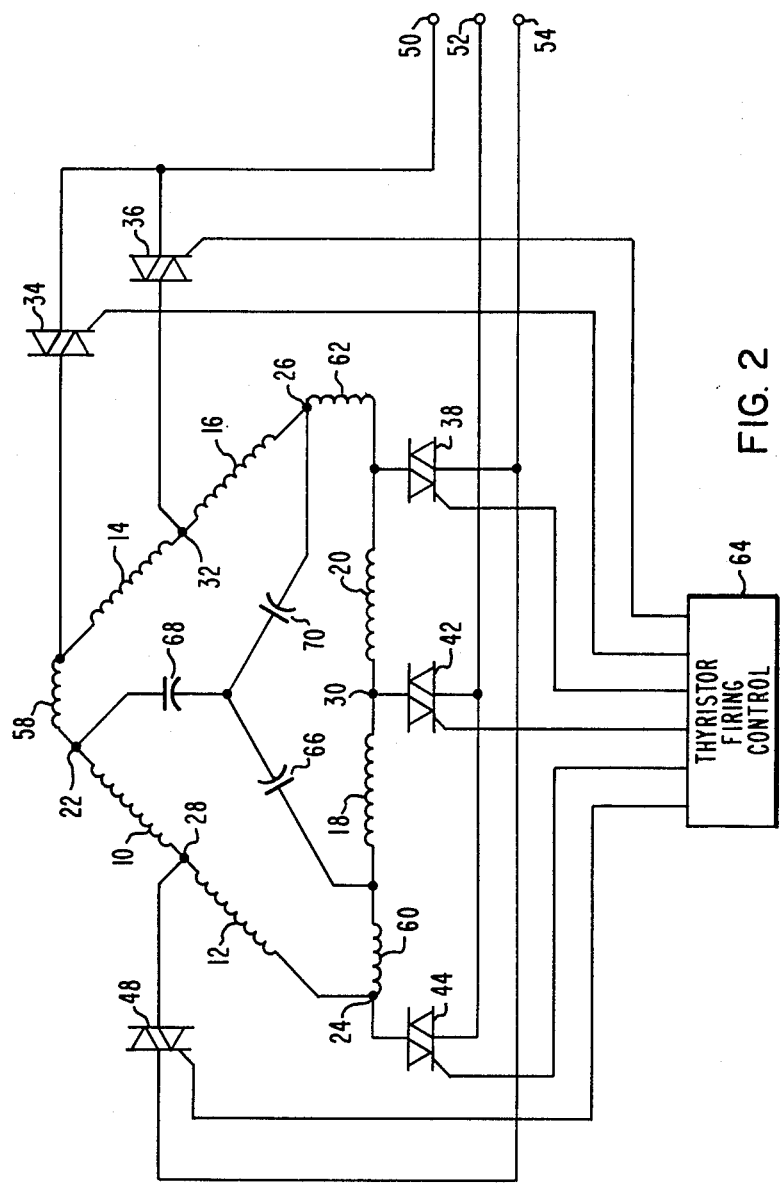
FIG. 2 is a schematic diagram of an electric machine system constructed in accordance with an alternative embodiment of the present invention.

FIG. 2 is a schematic of an alternative embodiment of the present invention. In this embodiment, three capacitors 66, 68 and 70 are connected in a star configuration between one set of stator coil terminals 22, 24 and 26. These capacitors, which may be AC oil-filled capacitors, have replaced thyristors 40 and 46 of FIG. 1, to form either an AC neutral point in the high-speed connection or alternately to serve as power factor compensation directly across the incoming line in the low speed configuration. As a general guideline, the capacitors may have a value of approximately 50 microfarads per horsepower, although total phase values of 140 microfarads have worked well with a motor rated at 11.2 horsepower.

Figure 3:
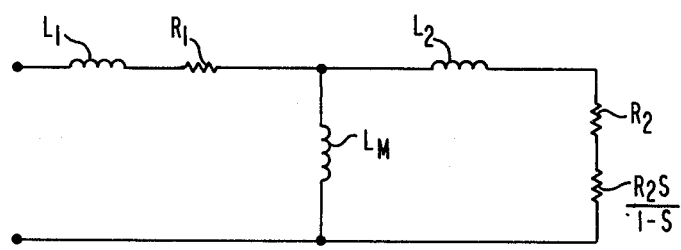
FIG. 3 is a schematic diagram of an equivalent circuit of an electric machine for use in the present invention.

FIG. 3 is a schematic diagram of an equivalent circuit for the machines of FIGS. 1 and 2. In this circuit, $L_1$ is the stator self-inductance or leakage inductance, $R_1$ is the stator resistance, $L_2$ is the rotor self-inductance, $R_2$ is the rotor resistance, $L_m$ is the magnetization inductance and S is the per unit slip. To operate the motor at a speed between the synchronous speeds set by the fundamental pole numbers, the thyristor firing circuits 56 and 64 of FIGS. 1 and 2 must control the operation of the thyristors such that their on-time exceeds the period of the external AC power source while being less than the combined magnetization-rotor loop time constant which is defined as $(L_m+L_2)/R_2$. In addition, in large machines, for example, greater than 100 horsepower, the on-time will generally be less than the rotor time constant of the machine, defined as $L_2/R_2$. For the circuit of FIG. 1, Table I lists the switching device duty cycles for several operating speeds.

TABLE I

| | Switching Device Duty Cycle (%) | | | | | | | |
| | Thyristors | | | | | | | |
| Speed | 34 | 36 | 38 | 40 | 42 | 44 | 46 | 48 |
| --- | --- | --- | --- | --- | --- | --- | --- | --- |
| P1 | 0 | 100 | 0 | 100 | 100 | 0 | 100 | 100 |
| P2 | 100 | 0 | 100 | 0 | 0 | 100 | 0 | 0 |
| P3 | 80 | 20 | 80 | 0 | 20 | 80 | 0 | 20 |
| P4 | 30 | 70 | 30 | 100 | 70 | 30 | 100 | 70 |

In Table I, P1 is the maximum speed of the machine while P2 is the minimum speed. P3 is equal to P2+0.3x(P1−P2) and P4 is equal to P2+0.6x(P1−P2).

Figure 4:
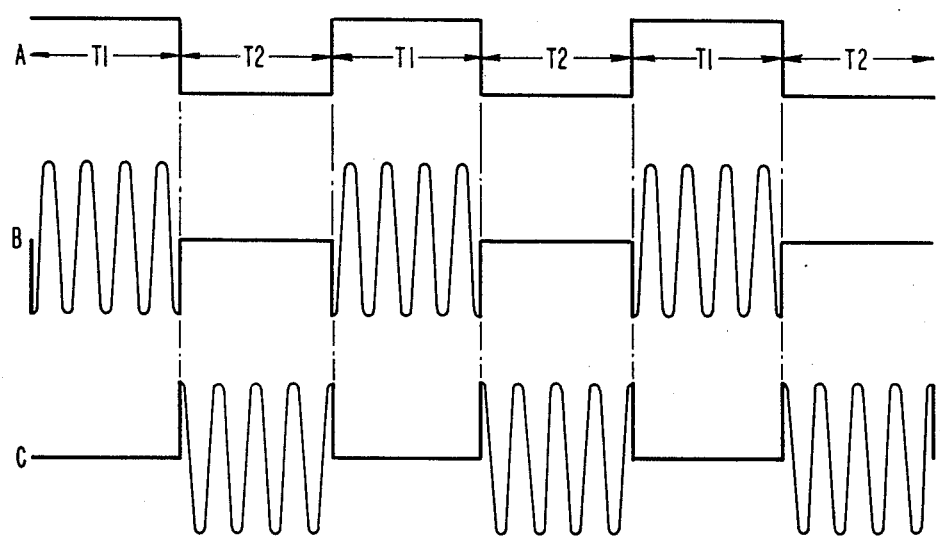
FIGS. 4 and 5 are a series of waveforms illustrating the operation of the electric machine systems of FIGS. 1 and 2.
Figure 5:
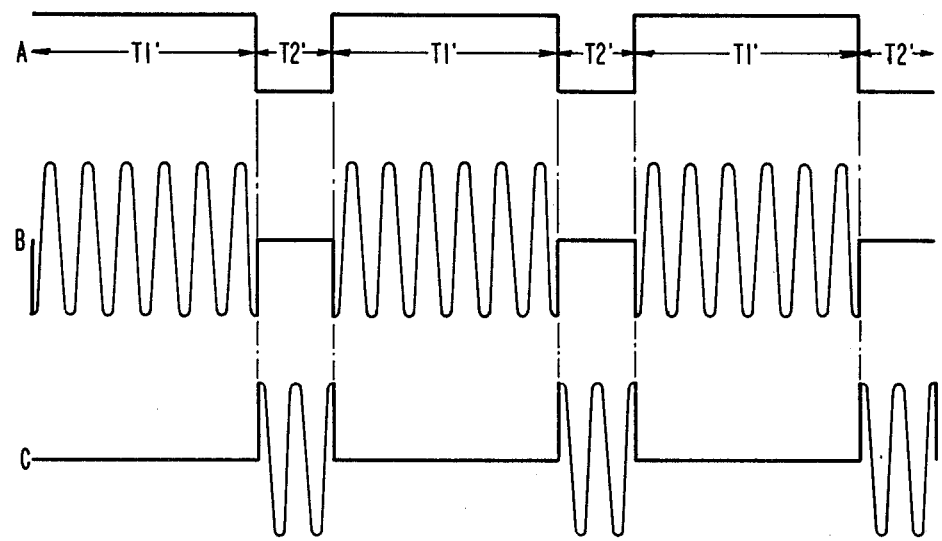

By examining FIG. 1, it can be seen that when thyristors 36, 40, 42, 46 and 48 are conducting, the stator winding is connected in a Y-configuration. This corresponds to the maximum operating speed. When thyristors 34, 38 and 44 are conducting, the stator winding is connected in a delta configuration corresponding to the minimum speed. FIGS. 4 and 5 show a series of waveforms which illustrate the operation of the circuit of FIGS. 1 and 2. Waveform A in each Figure illustrates a logic control signal which is related to the gating of the various thyristors. Waveform B in each Figure is the delta applied voltage while waveform C is the Y-applied voltage. In FIG. 4, the machine is operating at a speed approximately midway between the maximum and minimum speeds set by the winding configuration. T1 in waveform A represents a time during which the stator winding is receiving power in a delta configuration while T2 is the time during which the stator winding is receiving power in a Y-configuration. The waveforms of FIG. 5 illustrate the operation of the machine at a speed equal to the minimum speed plus approximately 25% of the difference between the minimum and maximum speed. In this operating mode, the machine receives power in the delta configuration approximately 75% of the time and in the Y-configuration approximately 25% of the time.

Figure 6:
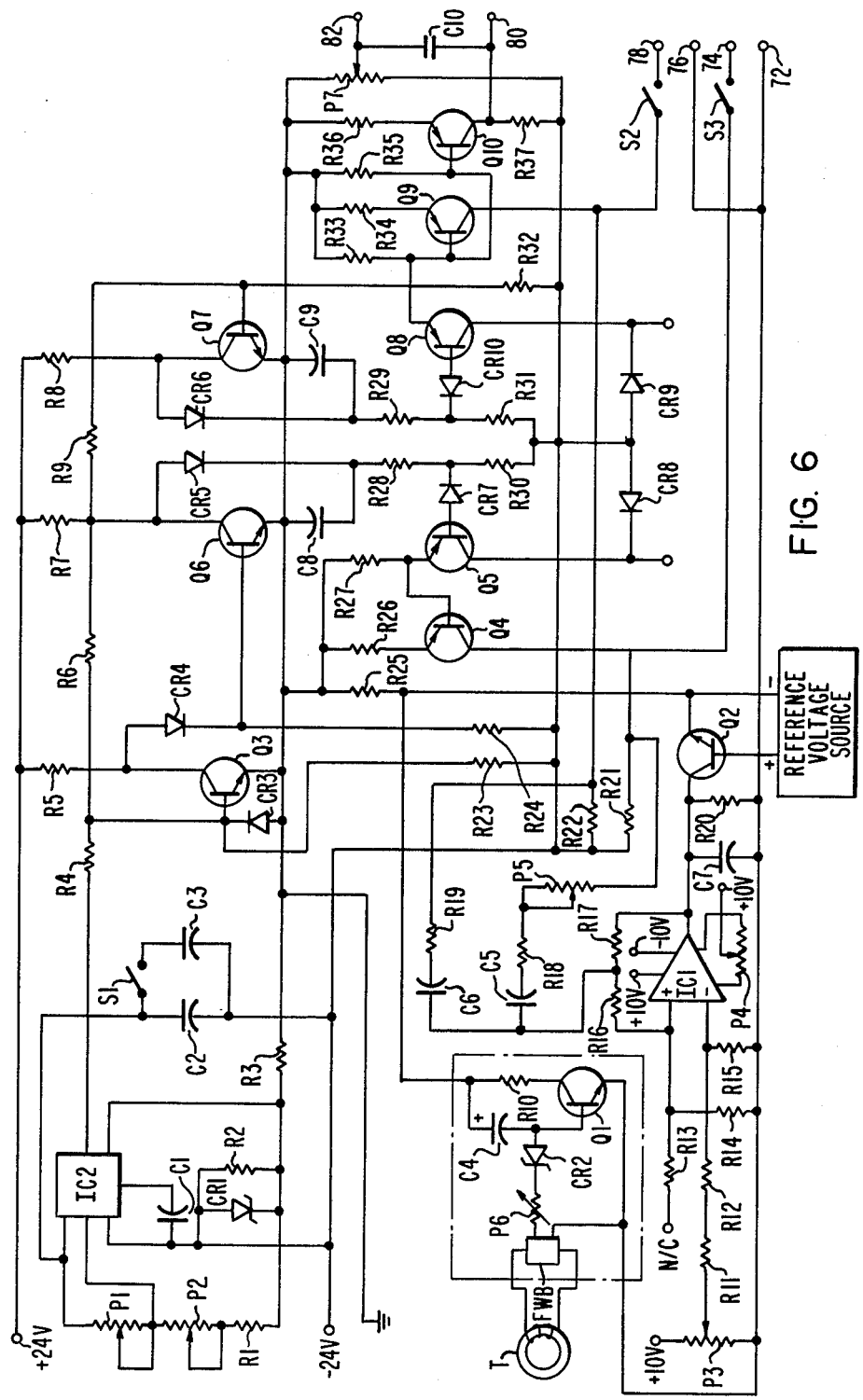
FIG. 6 is a schematic diagram of the master control board of the thyristor firing control of FIG. 1.

FIG. 6 is a schematic diagram of an example of a master control board for a thyristor firing control 56 of FIG. 1. This circuit was used to control a four pole/six pole amplitude modulated (PAM) 11.2 Hp motor, Westinghouse Electric Corporation Style No. 82D57701, Model SUDP, connected in accordance with FIG. 1. Thyristors 34, 38 and 40 were controlled by a signal appearing between terminals 72 and 74, while thyristors 36, 42 and 48 were controlled by a signal appearing between terminals 76 and 78, and thyristors 40 and 46 were controlled by a signal appearing between terminals 80 and 82. Siemens Type FO45T120 bilateral thyristor modules rated at 45 amps continuous and 460 volts line voltage, were used in place of thyristors 34, 36, 38, 40, 42, 44, 46 and 48.

The control board circuit of FIG. 6 allows an operator to set the following parameters:
a. Upper pole number on-time;
b. Lower pole number on-time;
c. Upper to lower transition soft-start blanking time;
d. Lower to upper transition soft-start blanking time; and
e. Common current-limit ramping rate.

In practice, only the first two limit adjustments would have to be brought outside the unit to an external panelboard or programmer if only one particular motor is in use per controller. Adjustment of the potentiometers establishing these limits in the laboratory was rather critical since neutralization of electrical noise is dependent on load; the pot settings were determined empirically to yield the lowest machine noise rather than overall efficiency. These settings are highly dependent on the rotor time constant of the particular machine.

Unlike conventional phase controllers which generally phase-back the applied voltage on every cycle to the motor, the CPAM controller is essentially a duty-cycle controller for which the applied motor voltage is a full sinusoid over the entire on-time for each pole number with the exception of a short blanking and ramping period which allows the new pole number connection to be excited in a soft-start fashion. This eliminates the peak motor and thyristor surge current but most importantly serves to reduce the electromechanical noise to a minimum. In the prototype test with the 11.2 Hp machine, a noise level of 75 dB at the midway speed of 1450 rpm was found to be the minimum attainable using the standard motor. The one modification made to the motor for all of these tests was to open up the permanent stator delta winding, separate groups that were tied to a common point and insert di/dt inductors 58, 60 and 62, physically located in the controller cabinet. Thus, instead of having the delta group (low speed) set of thyristors (34, 38, 44) feed the motor at exactly the same point as the shorting thyristors (40, 46) for the wye group (high speed), there is a non-linear inductance between the feed points.

The three di/dt inductors also have a secondary type of low current transformer winding and this is connected to a separate current limit board. In practice, it is only necessary to use one of the three current signals, for by tests it is readily established which phase draws the highest surge current and this suffices for all control purposes. It should be emphasized that with the standard PAM motor, none of the phases carry identical phase currents since the winding MMF's are not symmetrical in spatial layout. For example, in the 11.2 Hp PAM unit, all phase groups have the same number of coils, the same pitch, and number of turns. Yet the distribution factor varies between phase groups from about 0.79 to 0.85 for the parallel wye-connection and varies between 0.85 to 0.90 for the delta connection. Overall the unbalance in line currents has been limited to 3% for the six-pole mode (delta) and 5% for the four-pole mode (wye). This type of unbalance is of no real consequence to the continuous pole amplitude modulation controller because the main concern is the difference in average line currents between the delta and wye duty cycles and the nature of the applied mechanical load. The original design specification for the 11.2 Hp PAM motor was as a refrigeration compressor and in changing speed from 1125 rpm to 1715 rpm under load, the line current changes from 12.9 A to 15.6 A.

In terms of what electrical impedance the CPAM controller has attached in either mode, for example in the four-pole mode the total motor under load appears as an impedance of $0.0712 + j\ 0.1178$ per unit. This changes to a load of $0.0667 + j\ 0.1351$ per unit every 25 to 100 ms assuming that the mechanical output torque remains constant as the speed drops toward the six-pole point. The characteristics of the commercial PAM motor are given in Table II, and a parts list for the circuit of FIG. 6 is shown in Table III.

TABLE II
Characteristics of the Pole Amplitude Modulation Induction Motor

Overall Parameters

| | |
|---|---|
| Frame: | 215T |
| Stator Bore: | 5.25 in. |
| Stator Slots: | 36 |
| Rotor Slots: | 45 |
| Service Factor: | 1.0 |
| Insulation: | Class F |
| Line Voltage: | 460 V |
| Frequency: | 60 Hz |
| KVA Code: | J |
| Maximum Ambient Temperature | 40° C. |
| Four-Pole Mode | |
| Power Output: | 11.2 Hp |
| Rated Speed: | 1715 rpm |
| Rated Torque: | 34.5 ft-lb |
| Rated Current: | 15.6 A |
| Peak Torque: | 98 ft-lb |
| Locked Rotor Torque: | 64 ft-lb |
| Efficiency: | 82.3% |
| Power Factor: | 80.5% |
| Six-Pole Mode | |
| Power Output: | 7.5 Hp |
| Rated Speed: | 1125 rpm |
| Rated Torque: | 35 ft-lb |
| Rated Current: | 12.9 A |
| Peak Torque: | 83.5 ft-lb |
| Locked Rotor Torque: | 60 ft-lb |
| Efficiency: | 80% |
| Power Factor: | 68.5% |

TABLE III
Components of Thyristor Firing Control Circuit

| | |
|---|---|
| IC1 | MC1741CP2 |
| IC2 | NE555 |
| Q1 | 2N4424 |
| Q2 | 2N4424 |
| Q3 | 2N2222 |
| Q4 | 2N3741 |
| Q5 | 2N3799 |
| Q6 | 2N2222 |
| Q7 | 2N2222 |
| Q8 | 2N3799 |
| Q9 | 2N3741 |
| Q10 | 2N3799 |
| P1 | 50K |
| P2 | 30K |
| P3 | 2K |
| P4 | 10K |
| P5 | 100K |
| P6 | 2K |
| P7 | 30K |
| R1 | 33Ω |
| R2 | 5K |
| R3 | 4.7K |
| R4 | 10K |
| R5 | 22K |
| R6 | 178K |
| R7 | 1K |
| R8 | 4.7K |
| R9 | 22K |
| R10 | 22Ω |
| R11 | 3.3K |
| R12 | 1K |
| R13 | 10K |
| R14 | 1K |
| R15 | 1K |
| R16 | 150Ω |
| R17 | 150K |
| R18 | 120K |
| R19 | 150K |
| R20 | 10K |
| R21 | 20K |
| R22 | 20K |
| R23 | 147K |
| R24 | 1M |
| R25 | 50Ω |
| R26 | 36Ω |

TABLE III-continued

Components of Thyristor Firing Control Circuit

| | |
|---|---|
| R27 | 1K |
| R28 | 4.7K |
| R29 | 4.7K |
| R30 | 15K |
| R31 | 15K |
| R32 | 1M |
| R33 | 1K |
| R34 | 36Ω |
| R35 | 90K |
| R36 | 33Ω |
| R37 | 20K |
| C1 | 0.01 μf |
| C2 | 1.0 μf |
| C3 | 1.0 μf |
| C4 | 100 μf |
| C5 | 0.047 μf |
| C6 | 0.047 μf |
| C7 | 1.5 μf |
| C8 | 0.22 μf |
| C9 | 0.22 μf |
| C10 | 0.68 μf |
| CR1 | 1N3024 |
| CR2 | 6.2 V |
| CR3 | 1N4005 |
| CR4 | 1N4005 |
| CR5 | 1N4005 |
| CR6 | 1N4005 |
| CR7 | 1N4005 |
| CR8 | 1N4005 |
| CR9 | 1N4005 |
| CR10 | 1N4005 |
| FWB | Full-wave Bridge, 1A, 50 V |
| T | Current Transformer, 100:1 Ratio |

By using thyristor switches, the stator winding may be rapidly reconfigured between the low pole number and the high pole number several times per second, but for a period greater than the cycle time of the power source, and in so doing, effectively modulate the field pattern to give artificial intermediate synchronous field speeds between the two border field speeds of the pole amplitude modulation winding. With continuous pole amplitude modulation, a constant efficiency, rather than a slip dominated efficiency, is maintained throughout most of the intermediate speed range due to the presence of rotor leakage inductance which is prominent in large machines, for example, 200 horsepower and larger. When the stator is suddenly deenergized during a switching transient, the rotor leakage inductance causes the rotor currents to decay with a relatively long time constant, resulting in a true rotating magnetic field which persists while the machine stator is open. The rotating field pattern created by the rotor will interact with the stator field when reconfigured but not immediately at the upper synchronous pole number. This situation, which is broadly related to transient overspeeding in induction motors, means that at some intermediate speed, at least one component of the stator magnetomotive force is producing torque with a component of rotor magnetomotive force of a similar wavelength which is not equal to either the upper or lower pole amplitude modulation wavelength nor attributable to the slot ripple or reluctance torques. The operation of a continuous pole amplitude modulated machine may be described as continuously recurring space and time transients whereas the conventional definition of slip relates to a steady state phenomena.

It should be understood that the continuous pole amplitude modulation method of operating a machine in accordance with this invention includes the step of: switching an external alternating current power source alternately between the fundamental pole winding configurations of a conventional pole amplitude modulated machine wherein the time during which the source is continuously connected to each winding configuration is greater than the period of the source output and less than the combined magnetization-rotor loop time constant of the machine. This switching is used when the machine is to be operated at a speed which lies between the synchronous speeds defined by the fundamental pole numbers. If the machine is to be operated at a speed corresponding to one of its fundamental pole numbers, alternate switching is not used. If the machine is to be operated at a speed which is less than one of the synchronous speeds but greater than about 90% of that synchronous speed, the power source can be connected to the appropriate terminals and each cycle can be switched at a delayed phase angle to achieve a voltage reduction at the terminals.

Although the present invention has been described in terms of what are at present believed to be the preferred embodiments, it will be apparent to those skilled in the art that various changes and modifications may be made without departing from the scope of the invention. It is therefore intended that the appended claims cover all such changes and modifications which may occur within the scope of the invention.

What is claimed is:

1. An electric machine comprising:
   first and second sets of terminals for connection to an external AC power source;
   a stator winding electrically alternatively connected to said first and second sets of terminals, and wound to form a first number of poles between said first set of terminals and a second number of poles between said second set of terminals;
   a plurality of switches for switching said external power source alternatively between said first and second sets of terminals; and
   means for controlling said switches wherein the time during which said external power source is successively connected between said first and second sets of terminals is greater than the period of said external AC power source and less than the combined magnetization-rotor loop time constant of the machine, wherein the frequency of the external AC power source remains constant.

2. An electric machine as recited in claim 1, wherein said time during which said external power source is successively connected between said first and second sets of terminals is less than the rotor time constant of the machine.

3. An electric machine as recited in claim 1, wherein said switches are naturally commutated thyristors.

4. An electric machine as recited in claim 1, further comprising:
   a plurality of capacitors connected in a star configuration between one of said sets of terminals.

5. An electric machine as recited in claim 4, further comprising a plurality of surge limiting coils connected in series with circuit branches formed by the series connection of each of said capacitors and selected ones of said switches.

6. A method of operating an electric machine having a stator winding wound to form a first pole number between a first set of terminals and wound to form a second pole number between a second set of terminals, at speeds which lie between speeds defined by said first and second pole numbers, comprising the step of:

switching an alternating current power source alternatively between the first and second sets of terminals wherein the time during which said alternating power source is connected to either of said first and second sets of terminals, is greater than the period of the alternating current power source output and less than the combined magnetization-rotor loop time constant of the machine.

7. A method of operating an electric machine as recited in claim 6, wherein said switching applies power to said sets of terminals at a duty cycle of less than 100%.

8. A method of operating an electric machine having a stator winding wound to form a first pole number between a first set of terminals and a second pole number between a second set of terminals, wherein operation in a first speed range lying between the speeds defined by said first and second pole numbers comprises the step of:

switching an alternating current power source alternatively between the first and second sets of terminals wherein the time during which said alternating power source is connected to either of said first and second sets of terminals is greater than the period of the alternating current power source output and less than the combined magnetization-rotor loop time constant of the machine; and wherein operation in a second speed range comprises the step of switching each cycle of said alternating current power source to said first set of terminals at a delayed phase angle to regulate the voltage applied to said first set of terminals.

9. A method of operating an electric machine as recited in claim 8, wherein operation in a third speed range comprises the step of switching each cycle of said alternating current power source to said second set of terminals at a delayed phase angle to regulate the voltage applied to said second set of terminals.

* * * * *